US011867085B2

(12) United States Patent
Mizukami et al.

(10) Patent No.: US 11,867,085 B2
(45) Date of Patent: Jan. 9, 2024

(54) TURBINE BLADE

(71) Applicant: MITSUBISHI HEAVY INDUSTRIES, LTD., Tokyo (JP)

(72) Inventors: Satoshi Mizukami, Yokohama (JP); Masamitsu Kuwabara, Yokohama (JP); Satoshi Hada, Yokohama (JP); Saki Matsuo, Yokohama (JP); Yoshitaka Uemura, Yokohama (JP); Ryozo Tamura, Yokohama (JP); Yasumasa Kunisada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/778,974

(22) PCT Filed: Mar. 23, 2021

(86) PCT No.: PCT/JP2021/011939

§ 371 (c)(1),
(2) Date: May 23, 2022

(87) PCT Pub. No.: WO2021/193610

PCT Pub. Date: Sep. 30, 2021

(65) Prior Publication Data

US 2022/0412220 A1 Dec. 29, 2022

(30) Foreign Application Priority Data

Mar. 25, 2020 (JP) ................................ 2020-053727

(51) Int. Cl.
*F01D 5/18* (2006.01)

(52) U.S. Cl.
CPC .......... *F01D 5/187* (2013.01); *F05D 2220/32* (2013.01)

(58) Field of Classification Search
CPC .......... F01D 5/187; F01D 5/188; F01D 5/189; F05D 2220/32; F05D 2260/22141
See application file for complete search history.

(56) References Cited

U.S. PATENT DOCUMENTS 6,270,317 B1 * 8/2001 Manning ................ F01D 5/187 416/DIG. 2
6,742,991 B2 * 6/2004 Soechting .............. F01D 5/189 416/96 A (Continued)

FOREIGN PATENT DOCUMENTS

JP 50-23504 3/1975
JP 02-40001 2/1990

(Continued)

OTHER PUBLICATIONS

International Search Report dated Apr. 27, 2021 in International Application No. PCT/JP2021/011939 with English translation.

(Continued)

*Primary Examiner* — Courtney D Heinle
*Assistant Examiner* — Andrew Thanh Bui
(74) *Attorney, Agent, or Firm* — Wenderoth, Lind & Ponack, L.L.P.

(57) ABSTRACT

A turbine blade is provided with an airfoil portion having a leading edge, a trailing edge, and a pressure surface and a suction surface which extend between the leading edge and the trailing edge, the airfoil portion internally forming a cooling passage. The cooling passage includes: a first cooling passage located closer to the pressure surface than the suction surface; and a second cooling passage located closer to the suction surface than the pressure surface. The first cooling passage and the second cooling passage are separated by a partition member disposed in the airfoil portion. At least one communication space connecting the first (Continued)

cooling passage and the second cooling passage is formed in the partition member.

12 Claims, 8 Drawing Sheets

(56) References Cited

U.S. PATENT DOCUMENTS

| | | | | |
|---|---|---|---|---|
| 2010/0221123 | A1* | 9/2010 | Pal | F01D 5/189 416/97 R |
| 2010/0247290 | A1 | 9/2010 | Hada et al. | |
| 2014/0093392 | A1* | 4/2014 | Tibbott | F01D 5/188 29/889.6 |
| 2015/0016973 | A1* | 1/2015 | Mugglestone | F01D 9/02 416/96 R |
| 2016/0115796 | A1* | 4/2016 | Taniguchi | F01D 5/187 416/97 R |
| 2018/0030837 | A1 | 2/2018 | Dutta et al. | |
| 2018/0045058 | A1 | 2/2018 | Brzek et al. | |

FOREIGN PATENT DOCUMENTS

| | | |
|---|---|---|
| JP | 04-63901 | 2/1992 |
| JP | 2018-31369 | 3/2018 |
| WO | 2010/109954 | 9/2010 |

OTHER PUBLICATIONS

International Preliminary Report on Patentability dated Sep. 22, 2022 in International Application No. PCT/JP2021/011939 With English translation.

* cited by examiner

TURBINE BLADE

TECHNICAL FIELD

The present disclosure relates to a turbine blade.

The present application claims priority on Japanese Patent Application No. 2020-53727 filed Mar. 25, 2020, the entire content of which is incorporated herein by reference.

BACKGROUND

It is known that in a turbine blade of a gas turbine or the like, the turbine blade exposed to a high-temperature gas flow is cooled by flowing a cooling fluid through a cooling passage formed in the turbine blade. For example, a cooling passage of a turbine blade disclosed in Patent Document 1 has a configuration in which the cooling passage is branched into a suction side cooling passage and a pressure side cooling passage by a partition member, and both the cooling passages are merged on a trailing edge side of the turbine blade to form a merging cooling passage.

Casting a turbine blade having a hollow portion such as a cooling passage requires a core shaped such that a hollow portion and a solid portion of the turbine blade are inverted into a solid portion and a hollow portion, respectively. Then, in a core used for casting the turbine blade disclosed in Patent Document 1, a portion corresponding to the partition member is a hollow portion while a portion corresponding to the cooling passage is a solid portion. That is, this core has a shape in which the hollow portion corresponding to the partition member is disposed between the solid portion corresponding to the suction side cooling passage and the solid portion corresponding to the pressure side cooling passage.

CITATION LIST

Patent Literature

Patent Document 1: US Patent Application Publication No. 2018/0045058

SUMMARY

Problems to be Solved

Due to this shape, the core used for casting the turbine blade disclosed in Patent Document 1 has a problem in that the solid portion corresponding to the suction side cooling passage and the solid portion corresponding to the pressure side cooling passage are easily deformed so that they approach each other, that is, the core is easily broken.

In view of the above, an object of at least one embodiment of the present disclosure is to provide a turbine blade whereby it is possible to improve the strength of a core used for casting.

Solution to the Problems

In order to achieve the above-described object, a turbine blade according to the present disclosure is provided with an airfoil portion having a leading edge, a trailing edge, and a pressure surface and a suction surface which extend between the leading edge and the trailing edge, the airfoil portion internally forming a cooling passage. The cooling passage includes: a first cooling passage located closer to the pressure surface than the suction surface; and a second cooling passage located closer to the suction surface than the pressure surface. The first cooling passage and the second cooling passage are separated by a partition member disposed in the airfoil portion. At least one communication space connecting the first cooling passage and the second cooling passage is formed in the partition member.

Advantageous Effects

According to the turbine blade of the present disclosure, since at least one communication space connecting the first cooling passage and the second cooling passage is formed, in the core used for casting this turbine blade, at least one solid portion corresponding to the at least one communication space connecting the first cooling passage and the second cooling passage can support the solid portions corresponding to the first cooling passage and the second cooling passage. Thus it is possible to reduce a risk that the solid portion corresponding to the first cooling passage and the solid portion corresponding to the second cooling passage are deformed so that they approach each other to break. Consequently, it is possible to improve the strength of the core used for casting.

DETAILED DESCRIPTION

Hereinafter, the turbine blade according to embodiments of the present disclosure will be described with reference to the drawings. The following embodiments are illustrative and not intended to limit the present disclosure, and various modifications are possible within the scope of technical ideas of the present disclosure.

<Configuration of Gas Turbine in which Turbine Blade of Present Disclosure is Used>

Figure 1:
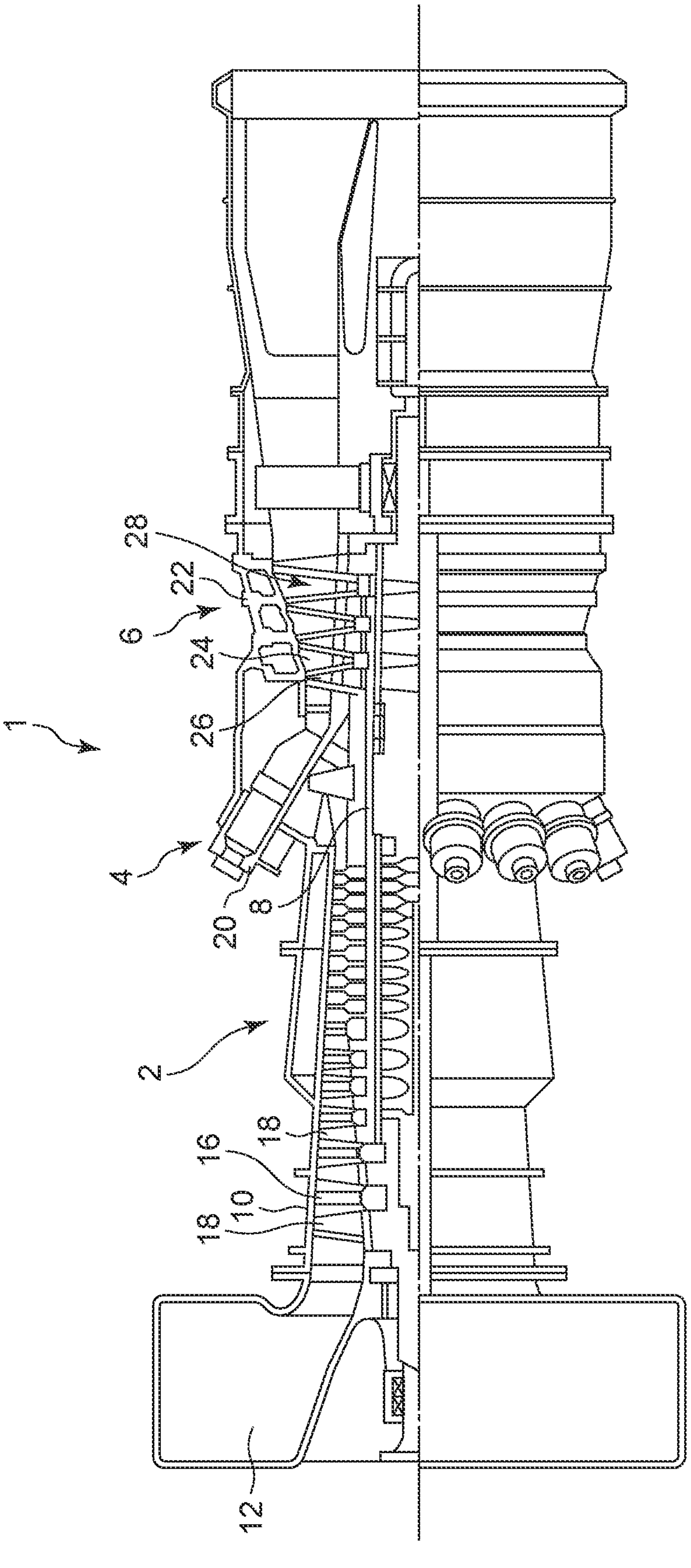
FIG. 1 is a schematic configuration diagram of a gas turbine in which a turbine blade is used according to an embodiment of the present disclosure.

As shown in FIG. 1, a gas turbine 1 includes a compressor 2 for generating compressed air, a combustor 4 for generating a combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of stator vanes 16 fixed to a compressor casing 10 and a plurality of rotor blades 18 implanted on a rotor 8. Intake air from an air inlet 12 is sent to the compressor 2. The air passes through the plurality of stator vanes 16 and the plurality of rotor blades 18 and is compressed into compressed air having a high temperature and a high pressure.

The combustor 4 is supplied with fuel and the compressed air generated by the compressor 2. In the combustor 4, the fuel and the compressed air are mixed and then combusted to generate a combustion gas which serves as a working fluid of the turbine 6. A plurality of combustors 4 may be disposed in a casing 20 centering around the rotor along the circumferential direction.

The turbine 6 includes a combustion gas flow passage 28 formed in a turbine casing 22, and includes a plurality of stator vanes 24 and rotor blades 26 disposed in the combustion gas flow passage 28. The stator vanes 24 are fixed to the turbine casing 22, and a set of the stator vanes 24 arranged along the circumferential direction of the rotor 8 forms a stator vane row. Further, the rotor blades 26 are mounted on the rotor 8, and a se of the rotor blades 26 arranged along the circumferential direction of the rotor 8 forms a rotor blade row. The stator vane rows and the rotor blade rows are alternately arranged in the axial direction of the rotor 8.

<Configuration of Turbine Blade of Present Disclosure>

The turbine blade of the present disclosure is intended for both the rotor blade 26 and the stator vane 24 of the turbine 6. Hereinafter, the turbine blade according to an embodiment of the present disclosure will be described as a stator vane 24, but the turbine blade may be the rotor blade 26.

Figure 2:
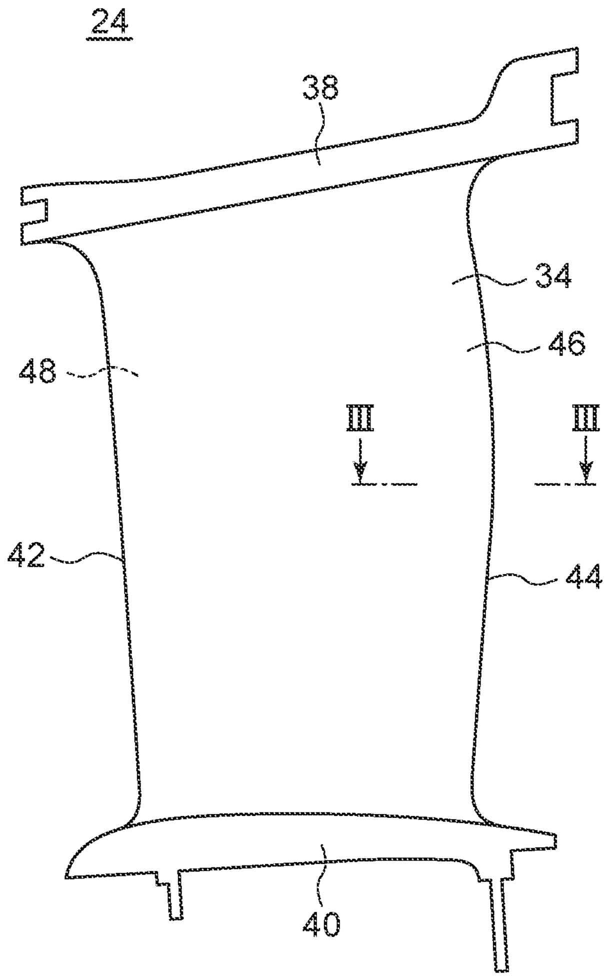
FIG. 2 is a diagram of the turbine blade as viewed in a direction from a pressure surface toward a suction surface according to an embodiment of the present disclosure.

As shown in FIG. 2, the stator vane 24 includes an airfoil portion 34. The airfoil portion 34 extends in the blade height direction (spanwise direction), and has an outer shroud 38 and an inner shroud 40 disposed at both ends in the blade height direction. The airfoil portion 34 has a leading edge 42 and a trailing edge 44 extending along the blade height direction, and has a pressure surface 46 and a suction surface 48 extending between the leading edge 42 and the trailing edge 44.

Figure 3:
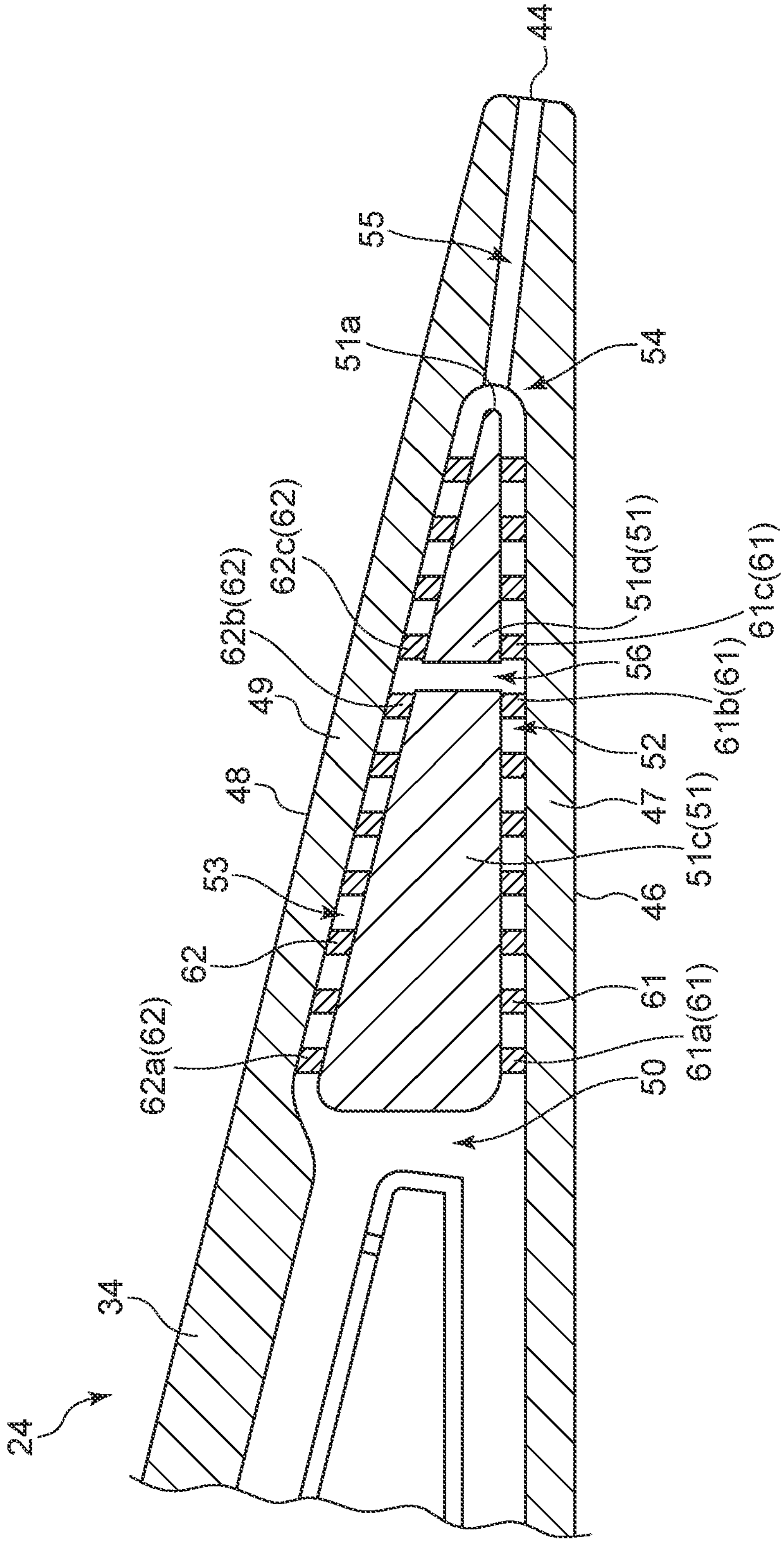
FIG. 3 is a cross-sectional view taken along line III-III in FIG. 2.

As shown in FIG. 3, the airfoil portion 34 internally forms a cooling passage 50 through which a cooling fluid (for example, air) for cooling the stator vane 24 flows. A partition member 51 is disposed inside the airfoil portion 34, that is, in the cooling passage 50, and a part of the cooling passage 50 is divided into a first cooling passage 52 and a second cooling passage 53. The first cooling passage 52 is located closer to the pressure surface 46 than the suction surface 48, and the second cooling passage 53 is located closer to the suction surface 48 than the pressure surface 46. The end portions of the first cooling passage 52 and the second cooling passage 53 on the side of the trailing edge 44 are connected to each other to form a merging portion 54. The cooling passage 50 further includes a plurality of outflow passages 55 each of which has one end opening to the merging portion 54 and another end opening to the trailing edge 44. The outflow passage 55 may be a passage having any cross-sectional shape such as a circle or a rectangle, or may be in the form of a slit.

The first cooling passage 52 is provided with a plurality of pressure side pin fins 61 each of which has one end connected to a pressure side wall 47 including the pressure surface 46 and another end connected to the partition member 51. The second cooling passage 53 is provided with a plurality of suction side pin fins 62 each of which has one end connected to a suction side wall 49 including the suction surface 48 and another end connected to the partition member 51.

In the partition member 51, a communication space 56 connecting the first cooling passage 52 and the second cooling passage 53 is formed. The communication space 56 may have any form such as a plate shape or a cylindrical shape. When the communication space 56 has a plate shape, the partition member 51 can be divided by the communication space 56 into two divided partition members 51*c*, 51*d* which are separated from each other. The partition member 51 may have not one communication space 56 but a plurality of communication spaces 56. When the partition member 51 has a plurality of plate-shaped communication spaces 56, the partition member 51 can be divided into three or more divided partition members. Further, when the partition member 51 has a plurality of communication spaces 56, the shapes of the communication spaces 56 may be different from each other.

In order to explain the effect obtained by the stator vane 24 having such configuration, it is necessary to understand the method for manufacturing the stator vane 24. Then, the method for manufacturing the turbine blade of the present disclosure will be described.

<Method for Manufacturing Turbine Blade of Present Disclosure>

Figure 4:
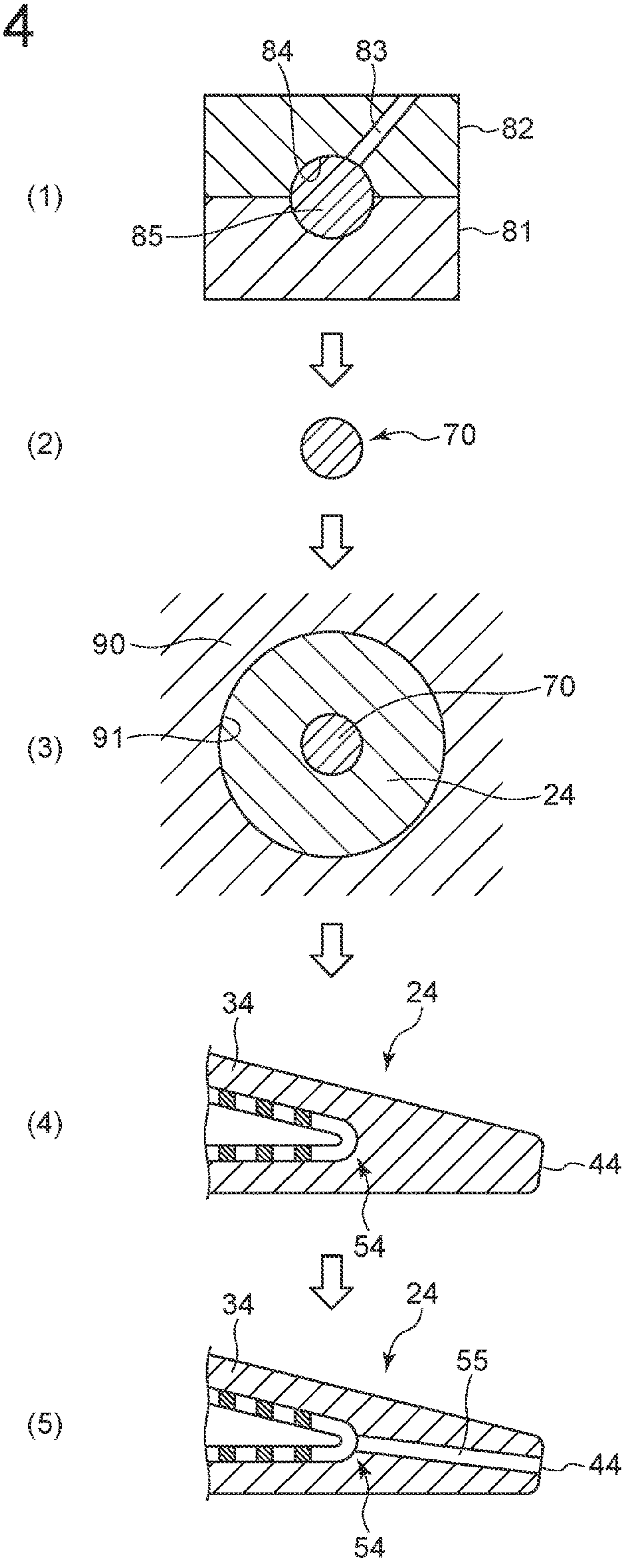
FIG. 4 is a schematic diagram showing steps of a method for manufacturing the turbine blade according to an embodiment of the present disclosure.

FIG. 4 is a schematic view showing steps of the method for manufacturing the stator vane 24. Although the stator vane 24 is manufactured by casting and processing (machining, etc.), casting the stator vane 24 having a hollow portion such as the cooling passage 50 requires a core 70 shaped such that a hollow portion and a solid portion of the stator vane 24 are inverted. Thus, the method for manufacturing the stator vane 24 involves the production of the core used for casting, the casting using the core, and the processing of the cast stator vane 24, as described in detail below.

In step (1), a ceramic material is injected into a space 84 defined by two molds 81 and 82 via a supply path 83 to produce a core precursor 85. In step (2), the core precursor 85 is fired to produce the core 70. In step (3), the stator vane 24 is cast by inserting the core 70 into an internal space 91 of a casting mold 90 and injecting a metal material into the internal space 91, In the stator vane 24, the portion corresponding to the core 70 becomes the hollow portion such as the cooling passage 50 (see FIG. 3). In step (4), the stator vane 24 is removed from the casting mold 90, and the core 70 is removed from the stator vane 24. In step (5), the plurality of outflow passages 55 are formed from the trailing edge 44 to the merging portion 54 by machining or the like.

In this method, steps (1) to (4) can be referred to as a production step of producing the airfoil portion 34, and step (5) can be referred to as a machining step of machining the plurality of outflow passages 55 in the airfoil portion 34. If the stator vane 24 is manufactured by the method including such steps, the cooling capacity of the stator vane 24 can easily be adjusted b adjusting the inner diameter of each outflow passage 55, making it possible to increase design flexibility of the stator vane 24.

Figure 5:
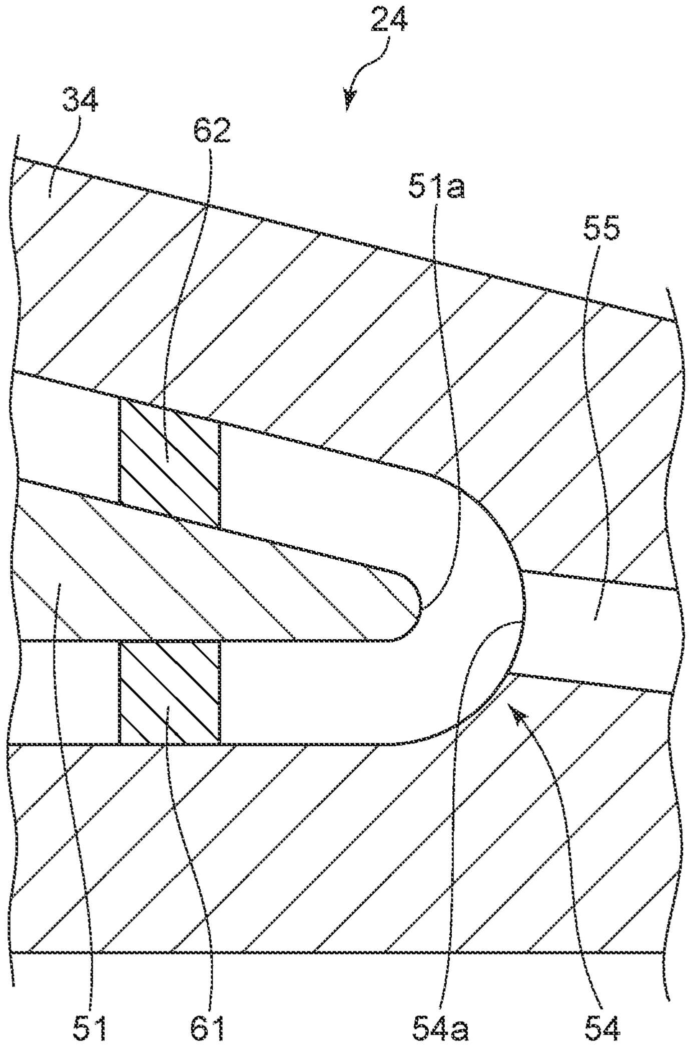
FIG. 5 is an enlarged cross-sectional view of a part of the inside of the airfoil of the turbine blade according to an embodiment of the present disclosure.

As shown in FIG. 5, the merging portion 54 is defined by an end portion 51*a* of the partition member 51 and a passage inner surface 54*a* facing the end portion 51*a*, and each of the end portion 51*a* of the partition member 51 and the passage inner surface 54*a* preferably has a rounded shape (curved surface).

As described above, the core used for casting a product internally including a hollow portion has a form in which a solid portion and a hollow portion in the product are inverted. Thus, the core 70 (see FIG. 4) used for casting the stator vane 24 includes a solid portion with a shape corresponding to the merging portion 54 which is the hollow portion in the stator vane 24. If the end portion 51*a* of the partition member 51 is sharp, there may be a problem in injectability of a metal material into the mold at the time of casting. On the other hand, if the passage inner surface 54*a* is sharp, there may be a problem in injectability of a raw material of the core into the mold at the time of producing the core 70. By contrast, the merging portion 54 having the above-described configuration in which the end portion 51*a* of the partition member 51 and the passage inner surface 54*a* both have the rounded shapes can avoid the deterioration in injectability of the metal material and the raw material of the core at the time of casting and producing the core.

<Effect Obtained by Turbine Blade of Present Disclosure>

Figure 6:
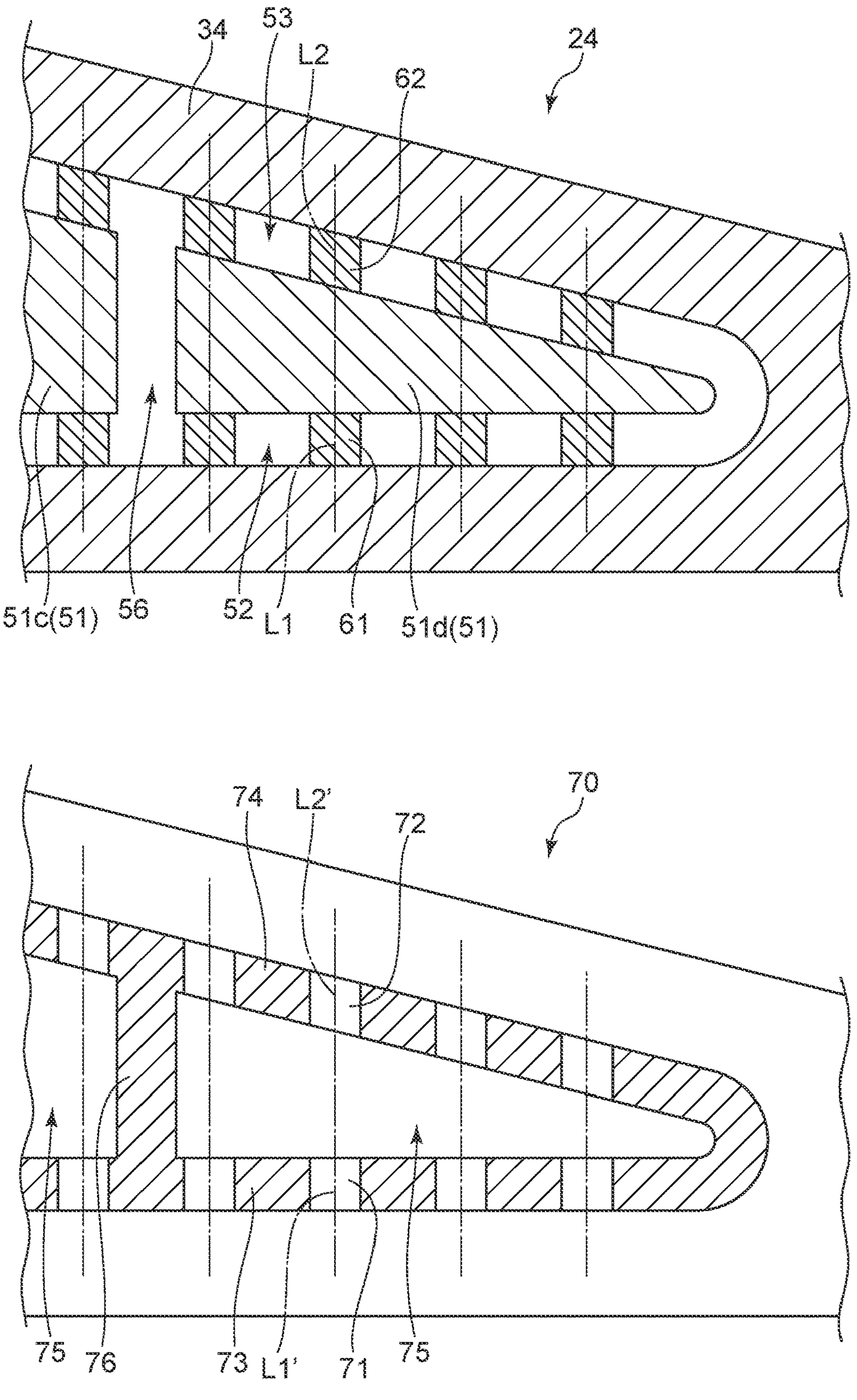
FIG. 6 shows respective cross-sectional views of the turbine blade and a core used in manufacturing the turbine blade according to an embodiment of the present disclosure.

As shown in FIG. 6, the stator vane 24 includes hollow portions as the first cooling passage 52 and the second cooling passage 53 and a solid portion as the partition member 51. Therefore, casting this stator vane 24 requires the core 70 having a hollow portion 75 corresponding to the partition member 51 between a solid portion 73 corresponding to the first cooling passage 52 and a solid portion 74 corresponding to the second cooling passage 53. Since the stator vane 24 has the communication space 56 connecting the first cooling passage 52 and the second cooling passage 53, in the core 70, a solid portion 76 corresponding to the communication space 56 can support the solid portion 73 and the solid portion 74. Thus, it is possible to reduce a risk that the solid portion 73 and the solid portion 74 are deformed so that they approach each other to break. Consequently, it is possible to improve the strength of the core 70.

When the partition member 51 is divided by the communication space 56 into the divided partition members 51*c*, 51*d* which are separated from each other, in the core 70, the solid portion 76 can support the solid portion 73 and the solid portion 74 over the entire area of the partition member 51 in the blade height direction. Thus, it is possible to reliably reduce a risk that the solid portion 73 and the solid portion 74 are deformed so that they approach each other to break. Consequently, it is possible to reliably improve the strength of the core 70.

Further, when the communication space 56 has a plate shape, in the core 70, the solid portion 76 can support the solid portion 73 and the solid portion 74 over a wide area of the partition member 51 in the blade height direction. Thus, it is possible to reliably reduce a risk that the solid portion 73 and the solid portion 74 are deformed so that they approach each other to break. Consequently, it is possible to reliably improve the strength of the core 70.

Further, when the communication space 56 has a cylindrical shape, the following effect can be obtained on the cooling of the stator vane 24. The presence of the communication space 56 improves the strength of the core 70, but causes the cooling fluid to partially flow through the communication space 56 between the first cooling passage 52 and the second cooling passage 53 in the stator vane 24, which may reduce the cooling effect on the stator vane 24. By contrast, when the communication space 56 has a cylindrical shape, the flow passage area of the cooling fluid flowing between the first cooling passage 52 and the second cooling passage 53 is smaller than when the communication space 56 has a plate shape, so that the flow of the cooling fluid between the first cooling passage 52 and the second cooling passage 53 can be suppressed. Therefore, it is possible to suppress the reduction in the cooling effect on the stator vane 24.

<Modifications of Turbine Blade of Present Disclosure>

Figure 7:
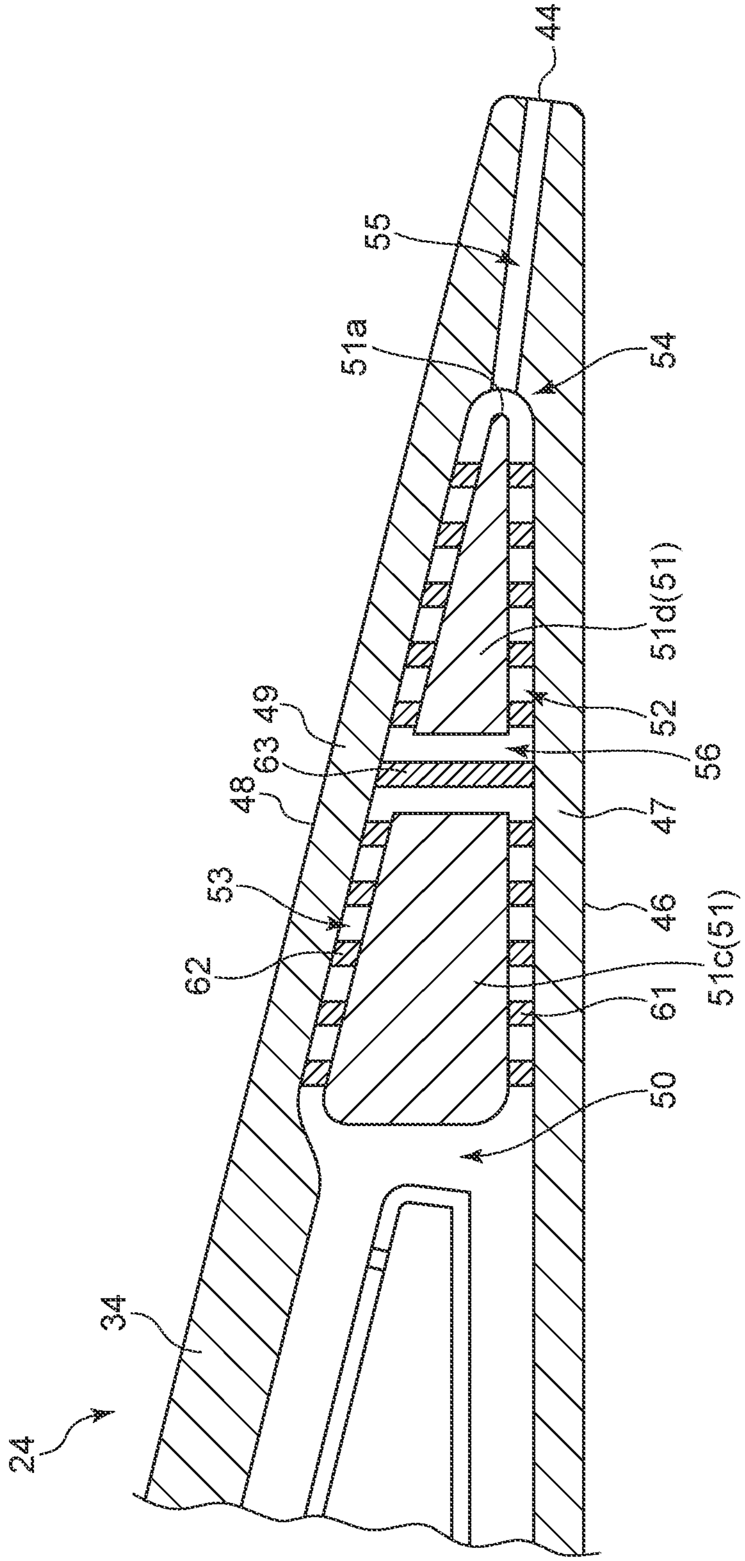
FIG. 7 is a cross-sectional view of a part of a modification of the turbine blade according to an embodiment of the present disclosure.

As shown in FIG. 7, the communication space 56 may be provided with a common pin fin 63 which has one end connected to the pressure side wall 47 and another end connected to the suction side wall 49. When the width of the communication space 56 in the chord direction of the stator vane 24 is larger than the pitch between adjacent pressure side pin fins 61, 61 and the pitch between adjacent suction side pin fins 62, 62, in the portion where the communication space 56 communicates with the first cooling passage 52 and the second cooling passage 53, the pitches become large, so that the cooling effect on the stator vane 24 may be reduced. In this regard, the common pin fin 63 provided in the communication space 56 eliminates the portion where the pitches become large, so that it is possible to prevent the reduction in the cooling effect on the stator vane 24.

In FIG. 3, the communication space 56 communicates with the first cooling passage 52 between the seventh pressure side pin fin 61*b* and the eighth pressure side pin fin 61*c* counting from the pressure side pin fin 61*a* closest to the leading edge 42 (see FIG. 3) of the pressure side pin fins 61, and communicates with the second cooling passage 53 between the seventh suction side pin fin 62*b* and the eighth suction side pin fin 62*c* counting from the suction side pin fin 62*a* closest to the leading edge 42 of the suction side pin fins 62, Thus, the communication space 56 preferably communicates with the first cooling passage 52 between the n-th pressure side pin fin and the (n+1)th pressure side pin fits counting from the pressure side pin fin closest to the leading edge 42 of the pressure side pin fins 61, and communicates with the second cooling passage 53 between the n-th suction side pin fin and the (n+1)th suction side pin fin counting from the suction side pin fin closest to the leading edge 42 of the suction side pin fins 62, where n is a natural number.

The presence of the communication space 56 improves the strength of the core 70, but causes the cooling fluid to partially flow through the communication space 56 between the first cooling passage 52 and the second cooling passage 53, which may reduce the cooling effect on the stator vane 24. In this regard, when the pressure difference between the first cooling passage 52 and the second cooling passage 53 via the communication space 56 can be reduced, the flow of the cooling fluid between the first cooling passage 52 and the second cooling passage 53 can be suppressed. Generally, a pressure loss occurs when the cooling fluid flowing through the first cooling passage 52 and the second cooling passage 53 passes through the pressure side pin fins 61 and the suction side pin fins 62, respectively. Accordingly, the pressure of the cooling fluid that has passed through the n-th pressure side pin fin in the first cooling passage 52 is approximately equal to the pressure of the cooling fluid that has passed through the n-th suction side pin fin in the second cooling passage 53. Thus, with the above configuration, since the pressure difference between the first cooling passage 52 and the second cooling passage 53 via the communication space 56 is reduced, i.e., the communication space 56 connects the first cooling passage 52 and the second cooling passage 53 at a position where the pressures thereof are substantially equal, the flow of the cooling fluid between the first cooling passage 52 and the second cooling passage 53 can be suppressed. Therefore, it is possible to suppress the reduction in the cooling effect on the stator vane 24.

Here, the "substantially equal" means that the pressure difference between the first cooling passage 52 and the second cooling passage 53 via the communication space 56 is as small as possible.

Figure 8:
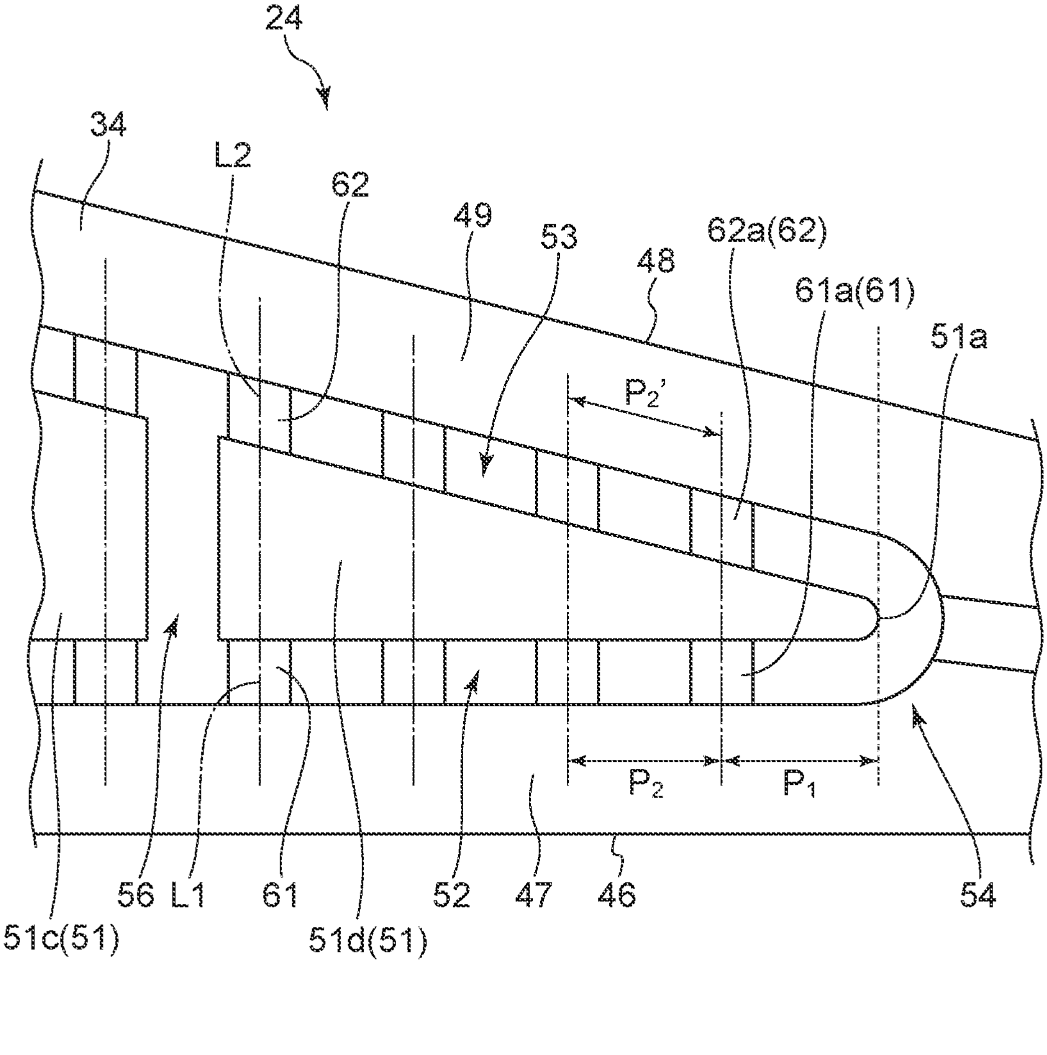
FIG. 8 is a cross-sectional view showing an example of arrangement of pressure side pin fins and suction side pin fins in the turbine blade according to an embodiment of the present disclosure.

Further, as show) in FIG. 8, a center line L1 of each of the plurality of pressure side pin fins 61 and a center line L2 of any one of the plurality of suction side pin fins 62 may coincide with each other. As shown in FIG. 6, when the stator vane 24 has such configuration, in the core 70, a center line L1' of each of the plurality of hollow portions 71 respectively corresponding to the plurality of pressure side pin fins 61 and a center line L2' of any one of the plurality of hollow portions 72 respectively corresponding to the portions of the plurality of suction side pin fins 62 coincide with each other. Then, in an inspection after the core 70 is produced, by emitting light from one of the hollow portions 71 and 72 whose center lines coincide with each other, it is possible to see the light from the other hollow portion if there is no problem in the respective hollow portions 71, 72. Conversely, if there is a blockage anywhere of each hollow portion 71, 72, it is impossible to see the light from the other hollow portion. Thus, it is possible to improve inspection workability after producing the core 70.

Further, as shown in FIG. 8, from the trailing edge 44 toward the leading edge 42 (see FIG. 2), a pitch $P_2$ between adjacent pressure side pin fins 61, 61 may be constant, as well as a pitch $P_2'$ between adjacent suction side pin fins 62, 62 may be constant. This embodiment may be combined with the above-described embodiment in which the center lines L1 and L2 coincide with each other, or the center lines L1 and L2 may not coincide with each other.

The cooling efficiency of the stator vane 24 is to be improved by turbulating the flow of the cooling fluid flowing through each of the first cooling passage 52 and the second cooling passage 53 by the pressure side pin fins 61 and the suction side pin fins 62. However, while the cooling fluid flows between adjacent pin fins, the turbulence of the cooling fluid flow is settled, and the flow is turbulated again by the next pin fin. Therefore, if the pitch between adjacent pin fins varies, the cooling efficiency fluctuates with the position, causing a failure that a metal temperature distribution becomes non-uniform. By contrast, if the pin fins are disposed at an appropriate and constant pitch, it is possible to reduce the risk of the fluctuated cooling efficiency.

Further, although not shown, the arrangement of the pressure side pin fins 61 and the arrangement of the suction side pin tins 62 may be different. For example, the outer diameter of each pressure side pin fin 61 and the outer diameter of each suction side pin fin 62 may be different from each other, or from the trailing edge 44 (see FIG. 3) toward the leading edge 42 (see FIG. 2), the pitch $P_2$ between the adjacent pressure side pin tins 61, 61 and the pitch $P_2'$ between the adjacent suction side pin fins 62, 62 may be different, or both of these features may be adopted. With such configuration, if the required cooling load is different between the side of the suction surface 48 and the side of the pressure surface 46, it is possible to cope with the respective cooling loads.

The contents described in the above embodiments would be understood as follows, for instance.

A turbine blade according to one aspect is a turbine blade (stator vane 24, rotor blade 26) that includes an airfoil portion (34) having a leading edge (42), a trailing edge (44), and a pressure surface (46) and a suction surface (48) which extend between the leading edge (42) and the trailing edge (48), the airfoil portion (34) internally forming a cooling passage (50). The cooling passage (50) includes: a first cooling passage (52) located closer to the pressure surface (46) than the suction surface (48); and a second cooling passage (53) located closer to the suction surface (48) than the pressure surface (46). The first cooling passage (52) and the second cooling passage (53) are separated by a partition member (51) disposed in the airfoil portion (34). At least one communication space (56) connecting the first cooling passage (52) and the second cooling passage (53) is formed in the partition member (51).

The turbine blade of the present disclosure includes hollow portions as the first cooling passage and the second cooling passage and a solid portion as the partition member. Therefore, casting this turbine blade requires a core having a hollow portion corresponding to the partition member between solid portions corresponding to the first cooling passage and the second cooling passage. According to the turbine blade of the present disclosure, since at least one communication space connecting the first cooling passage and the second cooling passage is formed, in the core used for casting this turbine blade, at least one solid portion corresponding to the at least one communication space connecting the first cooling passage and the second cooling passage can support the solid portions corresponding to the first cooling passage and the second cooling passage. Thus, it is possible to reduce a risk that the solid portion corresponding to the first cooling passage and the solid portion corresponding to the second cooling passage are deformed so that they approach each other to break. Consequently, it is possible to improve the strength of the core used for casting.

[2] A turbine blade according to another aspect is the turbine blade as defined in [1], where the partition member (51) is divided by the at least one communication space (56) into at least two divided partition members (51*c*, 51*d*) which are separated from each other.

With such configuration, in the core used for casting this turbine blade, at least one solid portion corresponding to the at least one communication space connecting the first cooling passage and the second cooling passage can support the solid portion corresponding to the first cooling passage and the solid portion corresponding to the second cooling passage over the entire area of the partition member in the blade height direction. Thus, it is possible to reliably reduce a risk that the solid portion corresponding to the first cooling passage and the solid portion corresponding to the second cooling passage are deformed so that they approach each other to break. Consequently, it is possible to reliably improve the strength of the core used for casting.

[3] A turbine blade according to yet another aspect is the turbine blade as defined in [1] or [2], where the at least one communication space (56) has a plate shape.

With such configuration, in the core used for casting this turbine blade, at least one solid portion corresponding to the at least one communication space connecting the first cooling passage and the second cooling passage can support the solid portion corresponding to the first cooling passage and the solid portion corresponding to the second cooling passage over a wide area of the partition member in the blade height direction. Thus, it is possible to reliably reduce a risk that the solid portion corresponding to the first cooling passage and the solid portion corresponding to the second cooling passage are deformed so that they approach each other to break. Consequently, it is possible to reliably improve the strength of the core used for casting.

[4] A turbine blade according to yet another aspect is the turbine blade as defined in [1], where the at least one communication space (56) has a cylindrical shape.

The presence of the at least one communication space connecting the first cooling passage and the second cooling passage improves the strength of the core used for casting the turbine blade, but causes the cooling fluid to partially flow between the first cooling passage and the second cooling passage in the turbine blade, which may reduce the cooling effect on the turbine blade. By contrast, when the at least one communication space has a cylindrical shape, the flow passage area of the cooling fluid flowing between the first cooling passage and the second cooling passage is smaller than when the at least one communication space has a plate shape, so that the flow of the cooling fluid between the first cooling passage and the second cooling passage can be suppressed. Therefore, it is possible to suppress the reduction in the cooling effect on the turbine blade.

[5]A turbine blade according to yet another aspect is the turbine blade as defined in any one of [1] to [4], where the first cooling passage (52) is provided with a plurality of pressure side pin fins (61) each of which has one end connected to a pressure side wall (47) including the pressure surface (46) and another end connected to the partition member (51), the second cooling passage (53) is provided with a plurality of suction side pin fins (62) each of which has one end connected to a suction side wall (49) including the suction surface (48) and another end connected to the partition member (51), and the communication space (56) is provided with a common pin fin (63) which has one end connected to the pressure side wall (47) and another end connected to the suction side wall (49).

When the width of the communication space in the chord direction of the turbine blade is larger than the pitch between adjacent pressure side pin fins and the pitch between adjacent suction side pin fins, in the portion where the communication space communicates with the first cooling passage and the second cooling passage, the pitches become large, so that the cooling effect on the turbine blade may be reduced. In this regard, the common pin fin provided in the communication space eliminates the portion where the pitches become large, so that it is possible to prevent the reduction in the cooling effect on the turbine blade.

[6] A turbine blade according to yet another aspect is the turbine blade as defined in any one of [1] to [5], where the first cooling passage (52) is provided with a plurality of pressure side pin fins (61) each of which has one end connected to a pressure side wall (47) including the pressure surface (46) and another end connected to the partition member (51), and the second cooling passage (53) is provided with a plurality of suction side pin fins (62) each of which has one end connected to a suction side wall (49) including the suction surface (48) and another end connected to the partition member (51). The at least one communication space (56) communicates with the first cooling passage (52) between the n-th pressure side pin fin (61_b_) and the (n+1)th pressure side pin fin (61_c_) counting from the pressure side pin fin (61_a_) closest to the leading edge (42) of the plurality of pressure side pin fins (61), and communicates with the second cooling passage (53) between the n-th suction side pin fin (62_b_) and the (n+1)th suction side pin fin (62_c_) counting from the suction side pin fin (62_a_) closest to the leading edge (42) of the plurality of suction side pin fins (62), where n is a natural number.

The presence of the at least one communication space connecting the first cooling passage and the second cooling passage improves the strength of the core used for casting the turbine blade, but causes the cooling fluid to partially flow between the first cooling passage and the second cooling passage in the turbine blade, which may reduce the cooling effect on the turbine blade. In this regard, when the pressure difference between the first cooling passage and the second cooling passage via the communication space can be reduced, the flow of the cooling fluid between the first cooling passage and the second cooling passage can be suppressed. Generally, a pressure loss occurs when the cooling fluid flowing through the first cooling passage and the second cooling passage passes through the pressure side pin fins and the suction side pin fins, respectively. Thus, with the above configuration [6], since the pressure difference between the first cooling passage and the second cooling passage via the communication space is reduced, the flow of the cooling fluid between the first cooling passage and the second cooling passage can be suppressed. Therefore, it is possible to suppress the reduction in the cooling effect on the turbine blade.

[7] A turbine blade according to yet another aspect is the turbine blade as defined in [5] or [6], where a center line (L1) of each of the plurality of pressure side pin fins (61) and a center line (L2) of any one of the plurality of suction side pin fins (62) coincide with each other.

With such configuration, in the core used for casting the turbine blade, the center line of each of the plurality of hollow portions respectively corresponding to the plurality of pressure side pin fins and the center line of any one of the plurality of hollow portions respectively corresponding to the portions of the plurality of suction side pin fins coincide with each other. Then, in the inspection after the core is produced, by emitting light from one of the hollow portions whose center lines coincide with each other, it is possible to see the light from the other hollow portion if there is no problem in the respective hollow portions. Conversely, if there is a blockage anywhere of each hollow portion, it is impossible to see the light from the other hollow portion. Thus, it is possible to improve inspection workability after producing the core.

[8] A turbine blade according to yet another aspect is the turbine blade as defined in any one of [5] to [7], where, from the trailing edge (44) toward the leading edge (42), a pitch ($P_2$) between adjacent pressure side pin fins (61, 61) is constant, as well as a pitch ($P_2'$) between adjacent suction side pin fins (62, 62) is constant.

The cooling efficiency of the turbine blade is to be improved by turbulating the flow of the cooling fluid flowing through each of the cooling passages by the pin fins. However, while the cooling fluid flows between the adjacent pin fins in the flow direction of the cooling fluid, the turbulence of the cooling fluid flow is settled, and the flow is turbulated again by the next pin fin. Therefore, if the pitch between adjacent pin fins varies, the cooling efficiency fluctuates with the position, causing a failure that a metal temperature distribution becomes non-uniform. By contrast, if the pin fins are disposed at an appropriate and constant pitch, it is possible to reduce the risk of the fluctuated cooling efficiency.

[9] A turbine blade according to yet another aspect is the turbine blade as defined in [5] or [6], where an outer diameter of each of the pressure side pin fins (61) and an outer diameter of each of the suction side pin fins (62) are different, or from the trailing edge (44) toward the leading edge (42), a pitch ($P_2$) between adjacent pressure side pin fins (61, 61) and a pitch ($P_2'$) between adjacent suction side pin fins (62, 62) are different.

With such configuration, if the cooling load is different between the suction surface side and the pressure surface side, it is possible to cope with the respective required cooling loads.

[10] A turbine blade according to yet another aspect is the turbine blade as defined in any one of [1] to [5], where the communication space (56) connects the first cooling passage (52) and the second cooling passage (53) at a position where pressures of the first cooling passage (52) and the second cooling passage (53) are substantially equal.

The presence of the at least one communication space connecting the first cooling passage and the second cooling passage improves the strength of the core used for casting the turbine blade, but causes the cooling fluid to partially flow between the first cooling passage and the second cooling passage in the turbine blade, which may reduce the cooling effect on the turbine blade. In this regard, when the pressure difference between the first cooling passage and the second cooling passage via the communication space can be reduced, the flow of the cooling fluid between the first cooling passage and the second cooling passage can be suppressed. With the above configuration [10], since the pressure difference between the first cooling passage and the second cooling passage via the communication space is reduced, the flow of the cooling fluid between the first cooling passage and the second cooling passage can be suppressed. Therefore, it is possible to suppress the reduction in the cooling effect on the turbine blade.

[11] A turbine blade according to yet another aspect is the turbine blade as defined in any one of [1] to [10], where the cooling passage (50) further includes a plurality of outflow passages (55) each having one end which opens to a merging portion (54) formed by connecting an end portion of the first cooling passage (52) on the side of the nailing edge (44) and an end portion of the second cooling passage (53) on the side of the trailing edge (44), and another end which opens to the trailing edge (44).

With such configuration, the outflow passages can be machined after casting the turbine blade including the first cooling passage and the second cooling passage which are connected at the merging portion. Thus, the cooling capacity can easily be adjusted by adjusting the inner diameter of the outflow passage, making it possible to increase design flexibility of the turbine blade.

[12] A turbine blade according to yet another aspect is the turbine blade as defined in [11], where the merging portion (54) is defined by the end portion (51*a*) of the partition member (51) on the side of the trailing edge (44) and a passage inner surface (54*a*) facing the end portion (51*a*), and the end portion (51*a*) of the partition member (51) on the side of the trailing edge (44) and the passage inner surface (54*a*) each have a rounded shape.

If the end portion of the partition member on the trailing edge side is sharp, there may be a problem in injectability of a metal material into the mold at the time of casting, and if the passage inner surface is sharp, there may be a problem in injectability of a raw material of the core into the mold at the time of producing the core. By contrast, in the above configuration [11], since the end portion of the partition member and the passage inner surface both have the rounded shapes, it is possible to avoid deterioration in injectability of the metal material and the raw material of the core at the time of casting and at the time of producing the core.

REFERENCE SIGNS LIST

24 Stator vane (Turbine blade)
26 Rotor blade (Turbine blade)
34 Airfoil portion
42 Leading edge
44 Trailing edge
46 Pressure surface
47 Pressure side wall
48 Suction surface
49 Suction side wall
50 Cooling passage
51 Partition member
51*a* End portion (of partition member on trailing edge side)
51*c* Divided partition member
51*d* Divided partition member
52 First cooling passage
53 Second cooling passage
54 Merging portion
54*a* Passage inner surface (of merging portion)
55 Outflow passage
56 Communication space
61 Pressure side pin fin
62 Suction side pin fin
63 Common pin fin
L1 Center line (of pressure side pin fin)
L2 Center line (of suction side pin fin)

The invention claimed is:

1. A turbine blade, comprising an airfoil portion having a leading edge, a trailing edge, and a pressure surface and a suction surface which extend between the leading edge and the trailing edge, the airfoil portion internally forming a cooling passage, wherein the cooling passage includes:

a first cooling passage located closer to the pressure surface than the suction surface; and a second cooling passage located closer to the suction surface than the pressure surface, wherein the first cooling passage and the second cooling passage are separated by a partition member disposed in the airfoil portion, wherein at least one communication space connecting the first cooling passage and the second cooling passage is formed in the partition member, wherein the at least one communication space is different from each of the first cooling passage and the second cooling passage, and wherein the partition member is a solid portion except for the at least one communication space.

2. The turbine blade according to claim 1, wherein the partition member is divided by the at least one communication space into at least two divided partition members which are separated from each other.

3. The turbine blade according to claim 1, wherein the at least one communication space has a plate shape.

4. The turbine blade according to claim 1, wherein the at least one communication space has a cylindrical shape.

5. The turbine blade according to claim 1, wherein the first cooling passage is provided with a plurality of pressure side pin fins each of which has one end connected to a pressure side wall including the pressure surface and another end connected to the partition member, wherein the second cooling passage is provided with a plurality of suction side pin fins each of which has one end connected to a suction side wall including the suction surface and another end connected to the partition member, and wherein the at least one communication space is provided with a common pin fin which has one end connected to the pressure side wall and another end connected to the suction side wall.

6. The turbine blade according to claim 1, wherein the first cooling passage is provided with a plurality of pressure side pin fins each of which has one end connected to a pressure side wall including the pressure surface and another end connected to the partition member, wherein the second cooling passage is provided with a plurality of suction side pin fins each of which has one end connected to a suction side wall including the suction surface and another end connected to the partition member, and wherein the at least one communication space communicates with the first cooling passage between an n-th pressure side pin fin and an (n+1)th pressure side pin fin counting from a pressure side pin fin closest to the leading edge of the plurality of pressure side pin fins, and the at least one communication space communicates with the second cooling passage between an n-th suction side pin fin and an (n+1)th suction side pin fin counting from a suction side pin fin closest to the leading edge of the plurality of suction side pin fins, where n is a natural number.

7. The turbine blade according to claim 5, wherein a center line of each of the plurality of pressure side pin fins and a center line of any one of the plurality of suction side pin fins coincide with each other.

8. The turbine blade according to claim 5, wherein, from the trailing edge toward the leading edge, a pitch between adjacent pressure side pin fins is constant, as well as a pitch between adjacent suction side pin fins is constant.

9. The turbine blade according to claim 5, wherein an outer diameter of each of the pressure side pin fins and an outer diameter of each of the suction side pin fins are different, or wherein, from the trailing edge toward the leading edge, a pitch between adjacent pressure side pin fins and a pitch between adjacent suction side pin fins are different.

10. The turbine blade according to claim 1, wherein the communication space connects the first cooling passage and the second cooling passage at a position where pressures of the first cooling passage and the second cooling passage are substantially equal.

11. The turbine blade according to claim 1, wherein the cooling passage further includes a plurality of outflow passages each having one end which opens to a merging portion formed by connecting a trailing-edge-side end portion of the first cooling passage and a trailing-edge-side end portion of the second cooling passage, and another end which opens to the trailing edge.

12. The turbine blade according to claim 11, wherein the merging portion is defined by a trailing-edge-side end portion of the partition member and a passage inner surface facing the trailing-edge-side end portion of the partition member, and wherein the trailing-edge-side end portion of the partition member and the passage inner surface each have a rounded shape.

* * * * *